US005455726A

United States Patent [19]
Liu

[11] Patent Number: 5,455,726
[45] Date of Patent: Oct. 3, 1995

[54] VERSATILE HEAD POSITIONER STOP

[75] Inventor: Larry Liu, Canoga Park, Calif.

[73] Assignee: Micropolis Corporation, Chatsworth, Calif.

[21] Appl. No.: 132,785

[22] Filed: Oct. 7, 1993

[51] Int. Cl.$^6$ .............................. G11B 5/55; G11B 21/08
[52] U.S. Cl. .......................................................... 360/106
[58] Field of Search ..................... 360/106, 105, 360/109, 103, 97.01, 97.03; 369/222; 74/526

[56] References Cited

U.S. PATENT DOCUMENTS

| | | | |
|---|---|---|---|
| 4,110,802 | 8/1978 | Ho et al. | 360/106 |
| 4,346,416 | 8/1982 | Riggle et al. | 360/106 |
| 4,471,396 | 9/1984 | Iftikar et al. | 360/106 |
| 4,635,151 | 1/1987 | Hazebrouck | 360/105 |
| 4,716,482 | 12/1987 | Walsh | 360/106 |
| 4,796,131 | 1/1989 | Chang | 360/106 |
| 4,879,617 | 11/1989 | Sampietro et al. | 360/106 |
| 4,890,176 | 12/1989 | Casey et al. | 360/105 |
| 4,933,792 | 6/1990 | Sleger et al. | 360/106 |
| 4,937,692 | 6/1990 | Okutsu | 360/105 |
| 4,947,274 | 8/1990 | Casey et al. | 360/105 |
| 4,949,206 | 8/1990 | Phillips et al. | 360/97.01 |
| 4,979,063 | 12/1990 | Ghose et al. | 360/106 |
| 4,989,108 | 1/1991 | Chang | 360/105 |
| 4,996,617 | 2/1991 | Yaeger et al. | 360/105 |
| 5,012,371 | 4/1991 | Pollard et al. | 360/105 |
| 5,023,736 | 6/1991 | Kelsic et al. | 360/105 |
| 5,134,608 | 7/1992 | Strickler et al. | 369/215 |
| 5,162,959 | 11/1992 | Arin et al. | 360/105 |

Primary Examiner—John H. Wolff
Assistant Examiner—David L. Ometz
Attorney, Agent, or Firm—Poms, Smith, Lande & Rose

[57] ABSTRACT

A versatile head positioner stop is provided which bi-directionally limits movement of a head positioning device in a Winchester hard disk drive system. The head positioner stop cushions the impact of the head positioner when it reaches predetermined limits. The head positioner stop has a base and means for mounting the base to the fixed disk drive housing in addition to a pair of side members affixed to the base and provides three distinct stages of resistance for accurately positioning the heads and minimizing the risk of head or disk damage during normal operation and power failure conditions. The head positioner stop is pre-stressed to improve dynamic energy absorption during head positioner crashes.

10 Claims, 3 Drawing Sheets

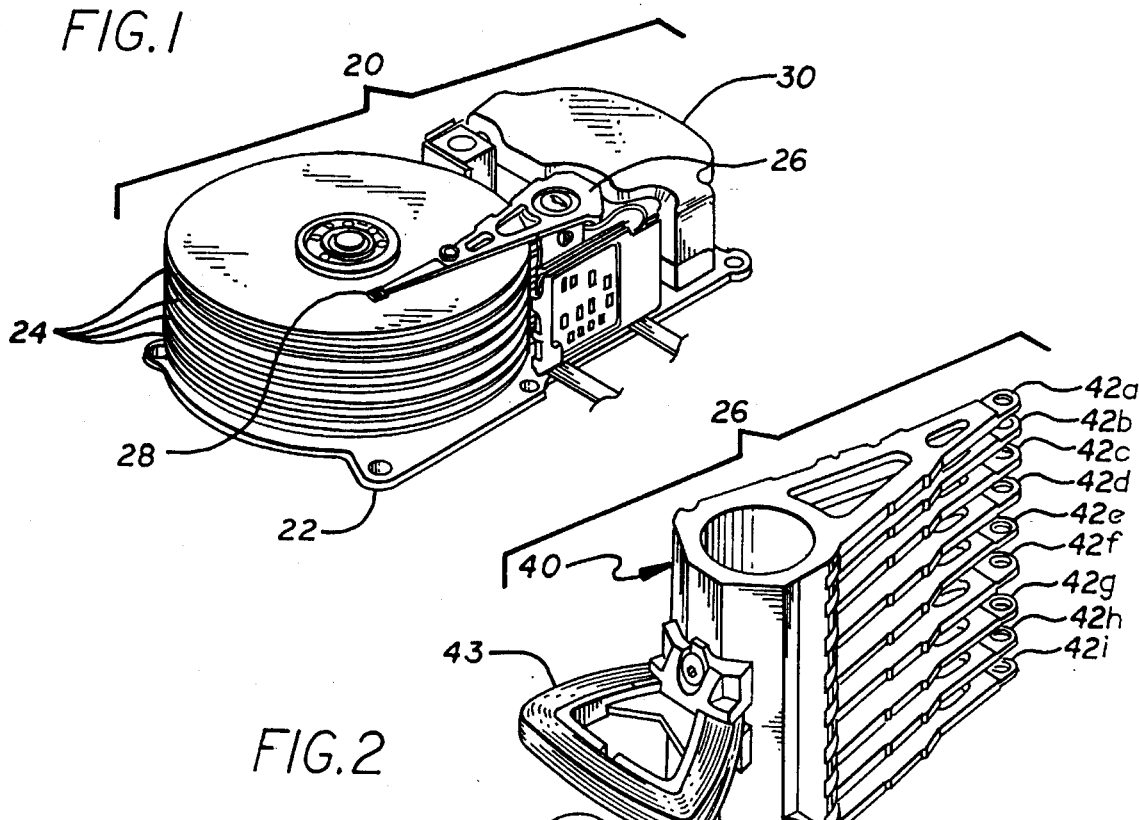
FIG. 1
FIG. 2
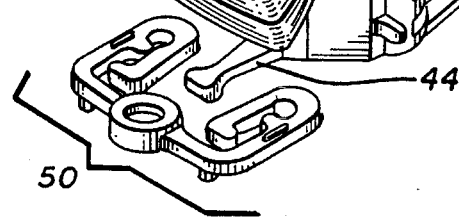
FIG. 3A
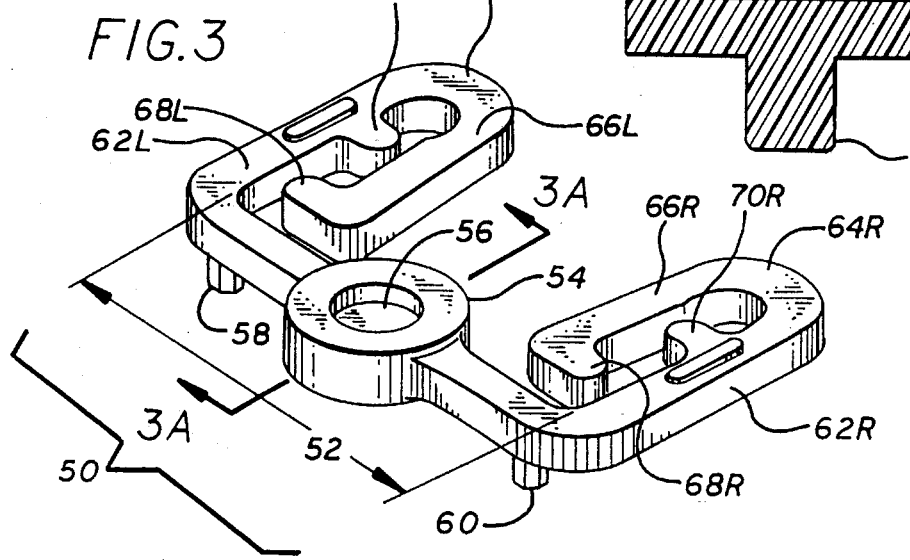
FIG. 3

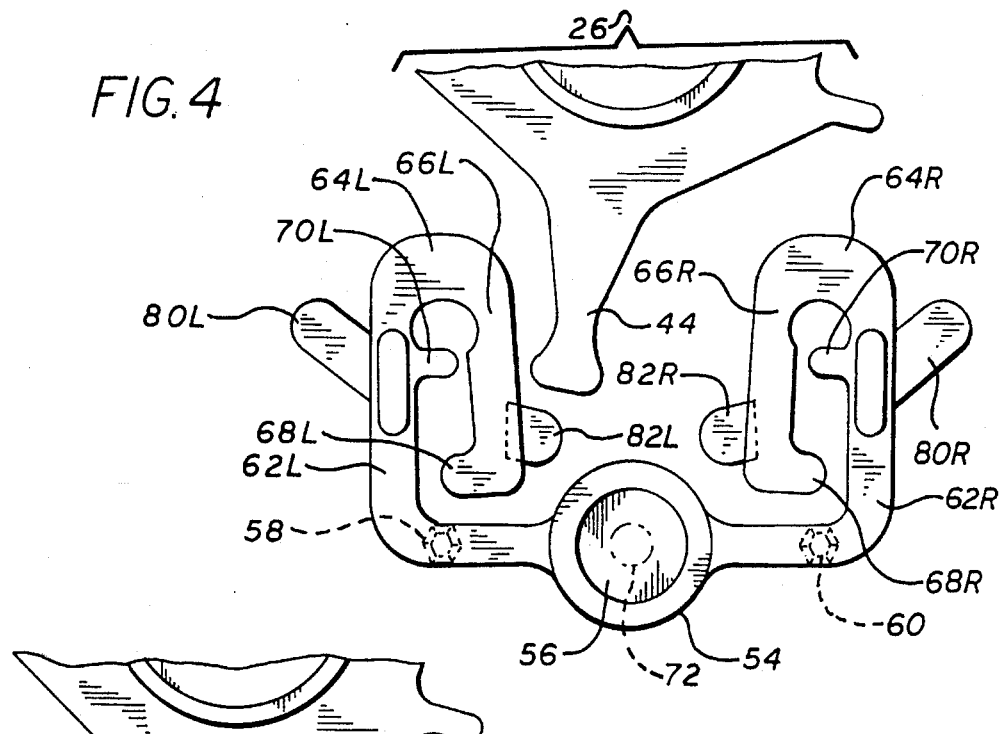
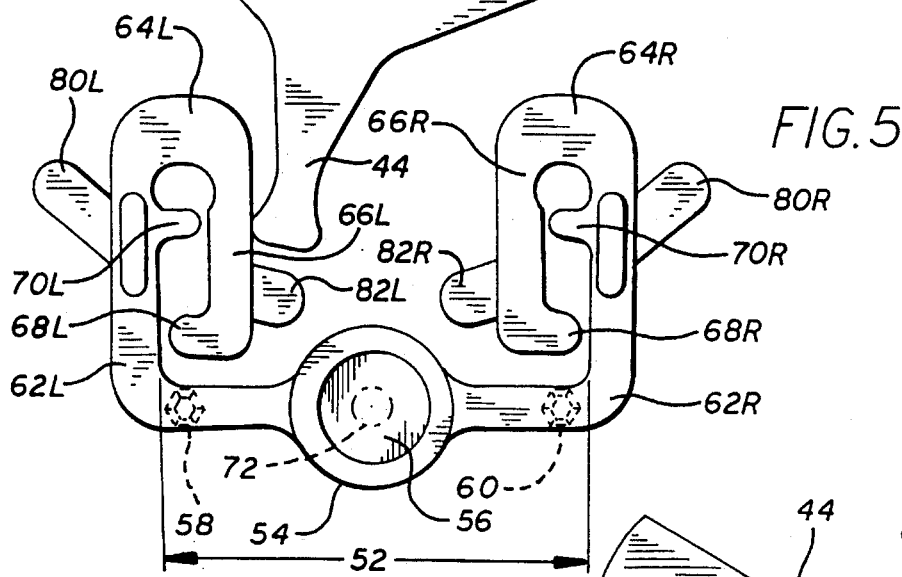
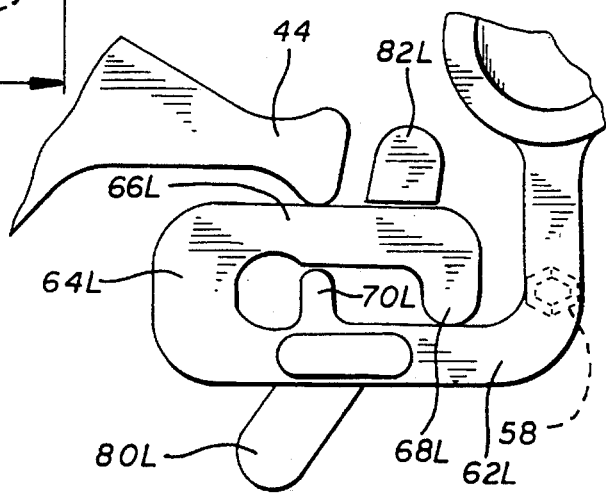

VERSATILE HEAD POSITIONER STOP

FIELD OF THE INVENTION

The present invention relates to arrangements for stopping the motion of head positioners in computer hard disk drives.

BACKGROUND OF THE INVENTION

Typical Winchester disk drive systems record information on circular information storage disks, each disk having a multiplicity of tracks concentrically located thereon. Each disk drive normally contains a plurality of disks, each disk recording surface having a magnetic head which transfers information to or from an external system. Each magnetic head is located on an arm, and all arms are aligned vertically and attached to a common head positioner assembly. The head positioner assembly is driven by a motor so that the arms and magnetic heads move uniformly across the surfaces of the vertically aligned disks. Head positioner assemblies are usually mounted to rotate the arms and magnetic heads along a circular path over the disks, but some positioner assemblies are driven linearly, producing motion back and forth across the disk.

When the power to the system is turned off, the head positioner assembly is driven by the motor to a landing zone under controlled velocity beyond the innermost or outermost track on which the heads may rest without damaging stored information. The motor drives the head positioner assembly toward the landing zone when power is interrupted, and generally a crash stop is provided to stop movement of the head positioner assembly once it reaches the landing zone. Positioning of the heads on the disks must be very precise, and optimal use of the disks necessitates the smallest possible landing zone to be allocated on each disk. Hence stopping of the head positioner assembly must be accomplished with minimal error.

Typical head positioner stop assemblies must provide two distinct levels of resistance, one for normal power down position limiting (low energy) and another for under loss servo control (electronic failure, high energy). Normal power down position limiting requires absorption of lower angular forces from the head positioner than crash (loss servo control) position limiting.

Previous position limiting methods have provided single level, uniform resistance for both normal and power down position limiting via a spring mechanism or a single stage position limiting arrangement. These methods have proven inadequate in stopping the head positioner under all conditions. Previous single stage stopping methods either provide inadequate resistance under crash conditions which may cause head or disk damage due to excess head deflection or, excess resistance during normal power down may also result in head damage due to high level shock fatigue and incorrect positioning of the heads when the head positioner attains its position limits. Single resistance position limiting arrangements of this type are presented in Chang, U.S. Pat. No. 4,796,131, and Strickler et. al, U.S. Pat. No. 5,134,608.

Spring type position limiting systems or variable damping methods for limiting head position generally provide the aforementioned single level of resistance and take up considerable space in disk drive systems. Spring type position limiting systems exhibiting these characteristics are typified by Ghose et. al, U.S. Pat. No. 4,979,063. As space in a Winchester drive is limited, such a stop arrangement should occupy as little volume as possible.

Accordingly, a principal object of the present invention is to provide a compact method for stopping the angular motion of the head positioner of a hard disk drive during normal power down and crash conditions without excess shock applied to the head positioner, and accomplishing this task using minimal volume within the disk drive.

SUMMARY OF THE INVENTION

According to the present invention, a versatile head positioner stop is provided which bi-directionally limits radial movement of the head positioning device. The head positioner stop cushions the impact of the head positioner when it reaches predetermined limits. The head positioner stop has a base and means for mounting the base to the fixed disk drive housing in addition to a pair of side members affixed to the base. The head positioner stop may be mounted to the disk drive system without screws or bolts. Each side member consists of a cantilevered arm with a distal tip, a support arm with a medial tip, and a connecting member joining the cantilevered arm to the support arm.

In accordance with additional features of the present invention, the cantilevered arm may be pre-stressed to improve dynamic energy absorption during head positioner crashes.

In accordance with further additional features of the present invention, rotation of the head positioner into the head positioner stop causes deflection of the cantilevered arm at a first linear rate. This first stage of deflection provides low stiffness for low shock characteristics to protect the positioner heads during drive power application or release. Further rotation by the arm causes further deflection of the cantilevered arm, resulting in application of force between the distal tip and the support at a linear rate greater than the first linear rate. This second stage of deflection has high spring stiffness for positioner crash under electronic failure or mechanical impact. Still further rotation by the arm into the head positioner stop causes further deflection of the cantilevered arm, resulting in application of force between the medial tip and the third cantilevered arm at a still greater linear rate. The third stage of deflection has a "hard wall" effect which stops the positioner after it has passed allowable deflection, thus minimizing the risk of the positioner heads falling off the disks or damage the disks. These three stages of resistance provide accurate head positioning capabilities during normal operation while minimizing risk of head or disk damage under power failure or severe impact conditions. The space required for the three stage resistance head positioner stop is less than 0.2 cubic inches.

In accordance with a broad aspect of the invention, there is provided a hard disk drive with a progressive stop assembly. The hard disk drive contains multiple hard disks with recording capability on each disk surface and heads for recording and/or reading digital information from the hard disks. The location of the heads on the disks is controlled by a movable head positioner which has a stop control member extending from it. The stop control member follows a predetermined path as the head positioner moves and engages a high strength stop assembly. The stop assembly has at least one resilient arm located in the path for engagement by the stop control member. The resilient arm has a normal rest position and an abutment point spaced away from the arm for engagement by the resilient arm as the arm is engaged and flexed a predetermined distance by the stop control member. The head positioner is initially subjected to a relatively low decelerating force with initial deflection of the arm and is subsequently subjected to a higher decelerating force with further deflection following engagement of the arm with the abutment point.

Other objects, features, and advantages of the invention will become apparent from a consideration of the following detailed description and from the accompanying drawings.

DESCRIPTION OF THE DRAWINGS

FIG. 1 is a perspective view of a rotary disk memory drive assembly embodying the invention;

FIG. 2 is a perspective view of the head positioner assembly showing the integrally mounted arm and the head positioner stop;

FIG. 3 is an isometric view of the head positioner stop;

FIG. 3A is a sectional view taken on the line 3A in FIG. 3.

FIG. 4 is a top view of the head positioner stop and the head positioner arm before the arm contacts the stop;

FIG. 5 is a top view of the head positioner stop and the head positioner arm as the arm contacts one of the cantilevered arms of the stop;

FIG. 6 is a top view of the head positioner stop and the head positioner arm as the arm contacts the cantilevered arm of the stop and the distal tip of the cantilevered arm contacts the support arm of the stop;

DESCRIPTION OF THE PREFERRED EMBODIMENT

Figure 7:
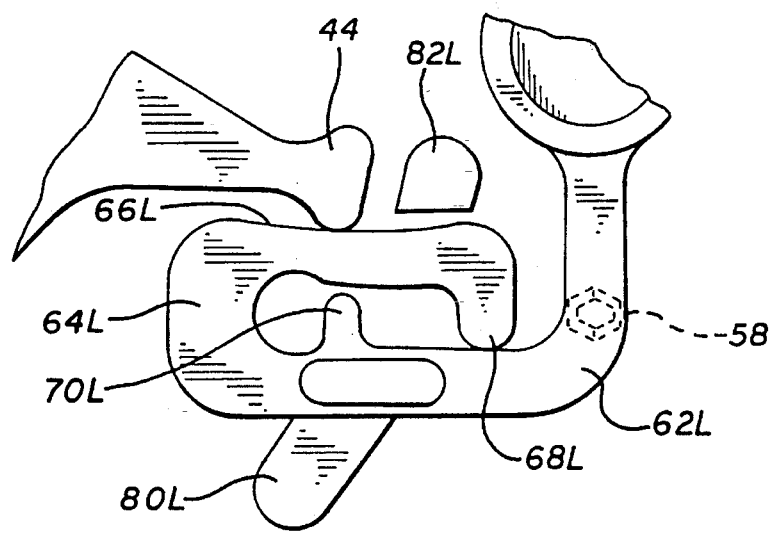
FIG. 7 is a top view of the head positioner stop and the head positioner arm as the arm further deforms the cantilevered arm of the stop while the distal tip contacts the support arm.

Referring more particularly to the drawings, FIG. 1 is a schematic showing a Winchester disk drive system 20 having the cover removed. The Winchester disk drive system 20 of FIG. 1 includes a fixed housing 22 and hard disks 24 having data storage capability on top and bottom of each disk. The Winchester disk drive system 20 also includes stationary magnetic structure 30 and a head positioner 26 which rotates in a clockwise or counterclockwise direction relative to the current supplied to the stationary magnetic structure 30 in accordance with generally known techniques. Rotation of the head positioner 26 moves the read/write heads 28 across the hard disks 22. Winchester disk drives of the type shown in FIG. 1 of the drawings are available from Micropolis Corporation, assignee of the present invention.

FIG. 2 of the drawings illustrates a head positioner 26 in greater detail. The head positioner 26 consists of a head positioner base 40 and a plurality of head positioner arms 42A through 42I. Movement of the head positioner base 40 is accomplished by rotating the drive element or coil 43 which is secured to the head positioner base. An arm 44 is integrally mounted to the head positioner base 40 to provide means for limiting the position of the head positioner using the minimum amount of volume in the Winchester disk drive system 20. Rotation of the head positioner 26 causes the position of the arm 44 to be limited by head positioner stop 50.

The nature of the head positioner stop 50 will be further developed by reference to FIGS. 3 through 8 of the drawings. With reference to FIG. 3 of the drawings, this shows a detailed view of the head positioner stop 50, including head positioner stop base 52 and two sets of direction limiting arms. Head positioner stop base 52 consists of mounting ring 54 with inner cavity 56. Mounting ring 54 and inner cavity 56 provide means for securing the head positioner stop 50 from above, but other means for securing the head positioner stop 50 may be employed obviating the need for mounting ring 54 and inner cavity 56. Head positioner base 52 may be constructed of a uniform beam without decreasing the efficiency of the head positioner stop 50. Means for securing the head positioner stop 50 from below are provided by left post 60 and right post 58. The adjacent structure of the drive includes recesses into which the depending posts 58 and 60 and a third central post are received. Affixed to the head positioner stop base 52 are two support arms 62R and 62L. The support arms 62R and 62L have medial tips 70R and 70L formed thereon and are joined to cantilevered arms 66R and 66L by joining members 64R and 64L. At the distal end of the cantilevered arms 66R and 66L are distal tips 68R and 68L. Head positioner stop 50 is a single piece formed from a resilient plastic material such as polyethermide, available from General Electric Corporation. Maximum dimensions of the head positioner stop 50 are 0.25 inches thickness (including left post 60 and right post 58), 1.00 inches width, and 0.80 inches depth. Other materials and dimensions may, of course, be employed.

FIG. 3A illustrates a sectional view of the head positioner stop 50. Mounting ring 54 surrounds inner cavity 56 for securing the head positioner stop 50 from above, while center post 72 provides means for securing the head positioner stop 50 from below.

Functioning of the head positioner stop 50 is illustrated in FIGS. 4 through 8. Rotation of head positioner 26 causes deformation of head positioner stop 50 in three stages. FIG. 4 illustrates the preassembled position of head positioner stop 50 before arm 44 contacts the head positioner. Cantilevered arms 66R and 66L are oriented toward arm 44 and held in assembled position (see FIG. 5) by base bosses 80R and 80L and 82R and 82L. The cantilevered arms 66R and 66L are thus pre-stressed to 1.5 pounds per inch (see FIG. 9) before impact from arm 44 in order to provide dynamic energy absorption during a crash.

FIG. 5 illustrates first contact between arm 44 and head positioner stop 50. Arm 44 deforms cantilevered arm 66L on first contact, and the stiffness of cantilevered arm 66L is approximately 300 pounds per inch during this first stage of deformation. Rotation of arm 44 during normal operation may attain speeds of 6 inches per second and provide 1.0 pound of force, while during power failure arm 44 may rotate at 100 inches per second and provide 9.0 pounds of force on head positioner stop 50. Normal operation of Winchester disk drive system 20 will generally not require further deflection of cantilevered arms 66R and 66L beyond the position illustrated in FIG. 5.

Further rotation of arm 44 into cantilevered arm 66 is illustrated in FIG. 6 of the drawings. This further rotation causes contact between the distal tip 68L of cantilevered arm 66L and support arm 62L thereby initiating a second stage of resistance. FIG. 7 illustrates further rotation of the arm through this stage wherein the cantilevered arm 66L is deformed by arm 44 while the distal tip 68L of cantilevered arm 66L is contacting support arm 62L, providing greater than twice the resistance of the first stage of resistance, or approximately 750 pounds per inch.

Figure 8:
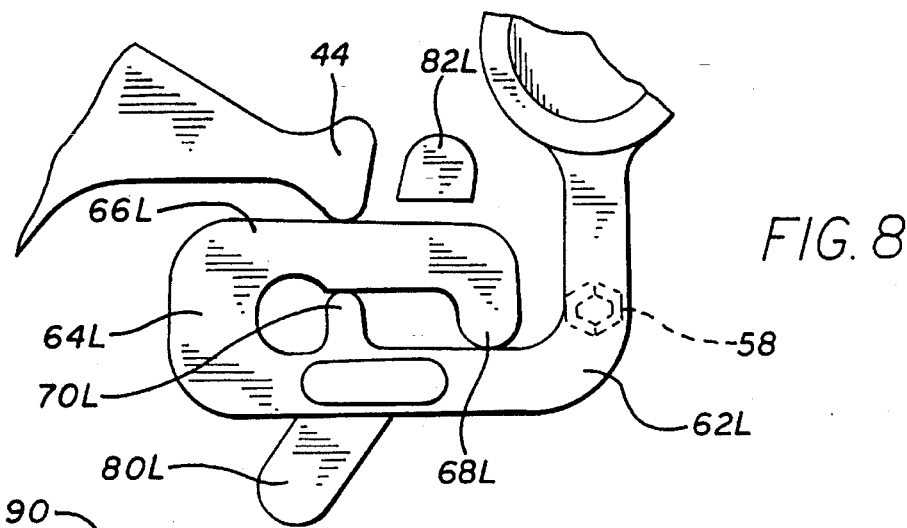
FIG. 8 is a top view of the head positioner stop and the head positioner arm as the arm deforms the cantilevered arm of the stop into contact with the medial tip on the support arm.

The final "hard wall" stage of resistance is illustrated in FIG. 8 of the drawings. Further rotation of arm 44 into cantilevered arm 66L causes contact between the medial tip 70L of support arm 72L and cantilevered arm 66L. This final "hard wall" stage of resistance provides greater than 3000 pounds per inch resistance for the configuration.

Figure 9:
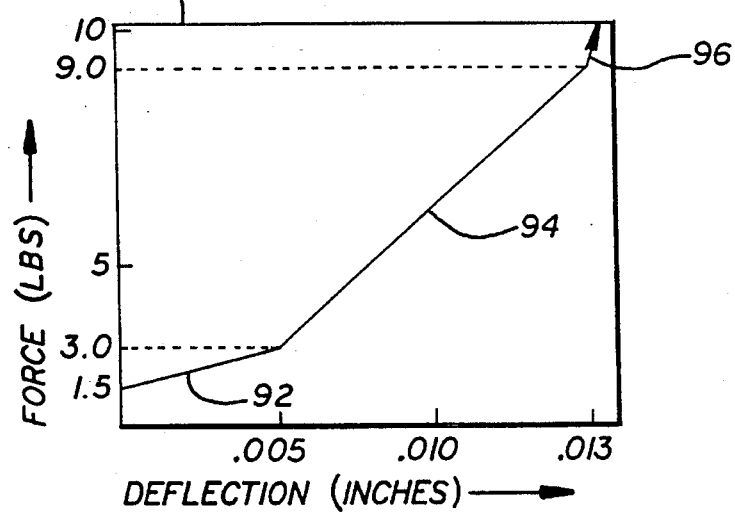
FIG. 9 is a plot of the force encountered by the head positioner arm at various stages of deflection of the head positioner stop.

FIG. 9 is a graph 80 showing the relationship between the force provided by head positioner stop member 50 and the deflection of the head positioner stop member 50. The pre-stress provided by the system is 1.5 pounds per inch, and first stage curve 82 illustrates the force-deflection relationship when cantilevered arm 66L is deformed. The spring constant for this first stage curve 82 is 300 pounds of force per inch of deflection. Second stage curve 84 illustrates the force-deflection relationship when cantilevered arm 66L is further deformed such that distal tip 68L of cantilevered arm 66L contacts support arm 62L. The spring constant for this second stage curve 84 is 750 pounds of force per inch of deflection. Third stage curve 86 illustrates the force-deflection relationship when cantilevered arm 66L is further deformed such that medial tip 70L of support arm 62L contacts cantilevered arm 66L. The spring constant for this third stage curve 86 is greater than 3000 pounds of force per inch of deflection.

It is to be understood that the foregoing detailed description relates to one illustrative embodiment of the invention. The present invention may also be implemented by other arrangements which accomplish the same function, including the use of a resilient member other than a three stage dual arm member, for example, a fixed horseshoe shaped member secured to the head positioner which bi-directionally deforms a single arm wherein two additional levels of resistance are provided by two deformation limiting points located at predetermined positions on each side of the single arm. Additionally, the present invention may be applied to head positioning devices which operate linearly rather than rotationally while providing the advantages described herein. Accordingly, the present invention is not limited to the precise arrangements as shown in the drawings, and as described in detail hereinabove.

I claim:

1. A hard disk drive digital storage system comprising:

a fixed housing;

a plurality of memory disks rotationally mounted to the fixed housing;

a plurality of magnetic transducer heads for retrieving information from said memory disks;

a head positioner for positioning the magnetic transducer heads relative to the memory disks between radial limits in a path adjacent to the memory disks;

means for moving the head positioner between said radial limits;

an arm integrally mounted on the head positioner; and a head positioner stop for limiting radial movement of the arm in both clockwise and counterclockwise directions and cushioning the impact of the arm when it strikes the head positioner stop, said head positioner stop including a head positioner stop base and means for mounting said head positioner stop base to the fixed housing, a pair of positioner stop side members integrally formed with the head positioner stop base, each positioner stop side member including a cantilevered arm having a distal tip, a support arm having a medial tip and a connecting member integrally formed with the cantilevered arm and the support arm, and means for mounting said head positioner arm between said pair of positioner side members for engagement with said cantilevered arms; and means for mounting and configuring said head positioner and head positioner stop so that rotation by the arm into the head positioner stop causes deflection of the cantilevered arm at a first linear rate, further rotation by the arm into the head positioner stop causes contact of the distal tip of the cantilevered arm with the support portion and further deflection of the cantilevered arm thereby causing force applied between the distal tip and the support arm at a second linear rate, and further rotation by the arm into the head positioner stop causes deflection of the cantilevered arm into the medial tip of the support arm, thereby causing force applied between the medial tip and the cantilevered arm at a third linear rate.

2. The hard disk drive digital storage system as set forth in claim 1, in which means are provided for pre-stressing the head positioner stop to approximately 1.5 pounds.

3. The hard disk drive digital storage system as set forth in claim 2, in which the first linear rate is approximately 300 pounds per inch and the second linear rate is approximately 750 pounds per inch.

4. The hard disk drive head positioner stop as set forth in claim 2, in which the head positioner stop base consists of a central resilient member, two cross pieces and means for affixing said head positioner stop base to the fixed housing.

5. A hard disk drive head positioner stop for limiting radial movement of a head positioner arm in two directions, comprising:

two sequential distinct and separate abutment points for successive flexing prior to engagement with either abutment point and flexing at progressively different rates upon successive engagement of the successive abutment points as the arm deforms the head positioner stop in one direction; and means for mounting and configuring said head positioner stop so that the head positioner stop is mechanically stiff substantially perpendicular to an impact force between the arm and the head positioner stop and resistance from the head positioner stop increases with respect to increasing arm deflection at a first linear rate to a first arm deflection limit, then increases at a second linear rate to a second arm deflection limit, then increases at a third linear rate to a third deflection limit, wherein the third linear rate is greater than the second linear rate and the second linear rate is greater than the first linear rate.

6. The hard disk drive head positioner stop as set forth in claim 5, in which the head positioner stop consists of an integrally formed piece of resilient material containing:

a positioner stop base;

a positioner stop right side member; and a positioner stop left side member;

wherein the positioner stop right side member is the identical mirror image of the positioner stop left side member.

7. The hard disk drive head position stop as set forth in claim 5, in which the head positioner stop side members each consist of:

a cantilevered arm having a distal tip;

a support arm having a medial tip; and a connecting member joining the cantilevered arm to the support arm.

8. The hard disk drive head positioner stop as set forth in claim 5, in which:

rotation by the arm into the head positioner stop causes deflection of the cantilevered arm at the first linear rate;

further rotation by the arm into the head positioner stop causes deflection of the cantilevered arm thereby causing force applied between the distal tip and the support arm at the second linear rate;

further rotation by the arm into the head positioner stop causes deflection of the cantilevered arm thereby causing force applied between the medial tip and the cantilevered arm at the third linear rate.

9. The hard disk drive head positioner stop as set forth in claim 6, in which the first linear rate is approximately 300 pounds per inch and the second linear rate is approximately 750 pounds per inch.

10. The hard disk drive head positioner stop as set forth in claim 5, in which the head positioner stop is pre-stressed to approximately 1.5 pounds.

* * * * *